455-611 AU 233 EX

FIP3106 OR 3,654,473

United States Patent

Nussmeier

[15] 3,654,473

[45] Apr. 4, 1972

[54] PHASE MODULATION LASER COMMUNICATION SYSTEM

[72] Inventor: Thomas A. Nussmeier, Thousand Oakes, Calif.

[73] Assignee: Hughes Aircraft Company, Culver City, Calif.

[22] Filed: Apr. 28, 1969

[21] Appl. No.: 819,865

[52] U.S. Cl. ....................250/199

[51] Int. Cl. ....................H04b 9/00

[58] Field of Search ....................325/307; 250/199

[56] References Cited

UNITED STATES PATENTS

| | | | |
|---|---|---|---|
| 3,503,012 | 3/1970 | Gillard | 250/199 |
| 3,463,924 | 8/1969 | Culshaw et al. | 250/199 |
| 3,284,632 | 11/1966 | Niblack et al. | 250/199 |
| 3,171,127 | 2/1965 | Asteraki et al. | 325/307 |
| 3,229,223 | 1/1966 | Miller | 250/199 |

*Primary Examiner*—Robert L. Griffin
*Assistant Examiner*—Albert J. Mayer
*Attorney*—James K. Haskell and Paul M. Coble

[57] ABSTRACT

In the disclosed laser communication system, at a transmitter a linearly polarized laser carrier beam is phase modulated with an informational signal such that when the resultant beam is resolved into two linearly polarized component beams in mutually perpendicular planes the respective component beams are shifted forwardly and backwardly in phase by an amount proportional to the informational signal. In a receiver the received phase modulated beam is combined with a local oscillator laser beam which is linearly polarized in a plane parallel to the plane of polarization of the carrier beam, and the resultant beam is separated into a pair of linearly polarized laser beams in respective planes parallel to the planes of the aforementioned transmitter component beams. These linearly polarized laser beams are converted into respective intermediate frequency electrical signals, and a reproduction of the informational signal is obtained by phase comparing these electrical signals.

4 Claims, 1 Drawing Figure

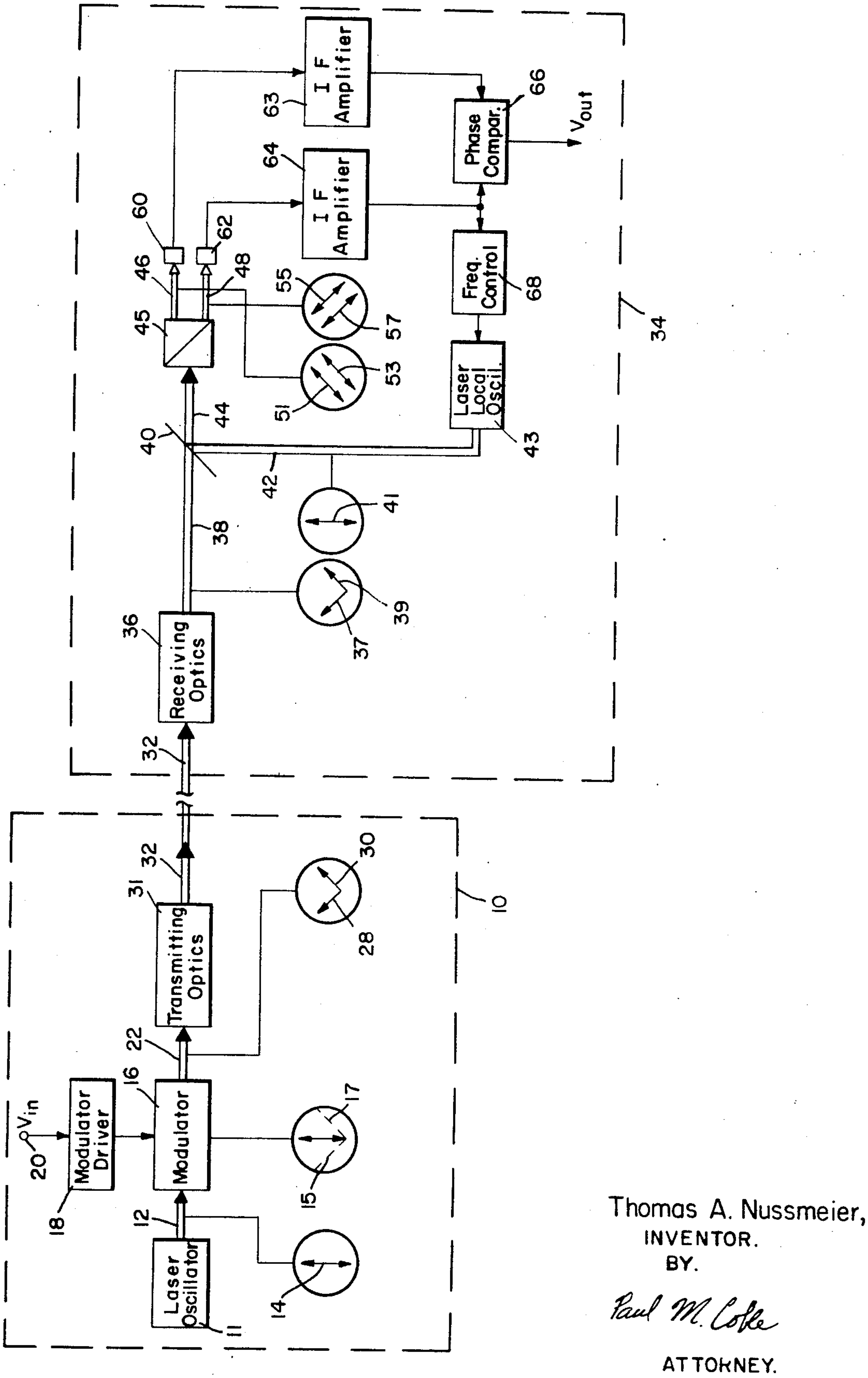
Thomas A. Nussmeier,
INVENTOR.
BY.
Paul M. Coble
ATTORNEY.

PHASE MODULATION LASER COMMUNICATION SYSTEM

This invention relates to communications, and more particularly relates to a laser communication system using phase modulation and demodulation.

Prior art phase modulation laser communication systems require that the phase modulated information carrying laser beam be compared with a non-phase-shifted reference beam. The reference beam is either the original unmodulated carrier beam or a beam from a second laser having the same phase as the original unmodulated carrier beam. Comparison with a beam from a second laser gives rise to stability problems, even when automatic tracking and phase locking techniques are used. Comparison with the original unmodulated carrier beam requires that a second optical channel be used to transmit the reference carrier to the receiving station. Thus, prior art communication systems using phase modulated laser beams are physically complex and impractical, and in addition, have relatively low information detection ability.

Accordingly, it is an object of the present invention to provide a communication system utilizing phase modulation of a laser beam, and which system is simpler in design and more reliable in operation than phase modulation laser communication systems of the prior art.

It is a further object of the invention to provide a phase modulation laser communication system which requires only a single optical transmission channel and a minimum number of optical components, thereby minimizing internal loss.

It is a still further object of the invention to provide a phase modulation laser communication system in which the entire output of the transmitter laser is utilized, thereby maximizing the power level of the transmitted signals.

A laser communication system according to the invention comprises a phase modulation transmitter and operatively associated receiver. In the transmitter a linearly polarized laser carrier beam at a predetermined carrier frequency is phase modulated with an informational signal such that when the resultant beam is resolved into two linearly polarized component beams in mutually perpendicular planes the respective component beams are shifted forwardly and backwardly in phase relative to the laser carrier beam, and the phase modulated laser beam is directed toward the receiver. In the receiver a local oscillator laser beam is generated at a frequency equal to the difference between the carrier frequency and a selected intermediate frequency, the local oscillator beam being linearly polarized in a plane parallel to the plane of polarization of the carrier beam. The received phase modulated laser beam and the local oscillator laser beam are combined, and the resultant beam is separated into a pair of linearly polarized laser beams in respective planes perpendicular to one another. Each of these linearly polarized laser beams is converted into an electrical signal at the intermediate frequency. The two electrical signals are compared in phase, and an electrical output signal is produced corresponding to the phase difference between these signals, the electrical output signal essentially reproducing the informational signal in the transmitter.

Other objects, advantages and characteristic features of the present invention will become more fully apparent from the following detailed description of a preferred embodiment of the invention when considered in conjunction with the accompanying drawing in which the sole FIGURE is a functional-type block diagram illustrating a phase modulation laser communication transmitter and operatively associated receiver according to the present invention.

Referring to the FIGURE with greater particularity, there is shown a phase modulation laser communication transmitter 10 which includes a laser oscillator 11 for producing a laser carrier beam 12. Beam 12 is linearly polarized in a preferred plane, for example as indicated by double headed arrow 14. Linear polarization of beam 12 may be accomplished by means of a Brewster angle window for the laser 11 or by means of an externally mounted polarizer or other means of linearly polarizing a laser beam.

Laser beam 12 is fed to a beam modulator 16. Modulator 16 employs as its active modulating element a device that is transparent to light of the frequency of beam 12 and is capable of providing the electro-optic effect, also referred to as induced birefringence. This effect is such that in the absence of an electric field the electro-optic modulating device has an index of refraction independent of the orientation of the plane of polarization of the incident beam. However, when an electric field is applied in a direction dependent on the composition of the device, the index of refraction is changed according to the intensity of the applied electric field along two mutually perpendicular induced axes of birefringence, one axis having a higher index of refraction than the other. Such a device may be a Kerr cell, a KDP (potassium dihydrogen phosphate) crystal or an ADP (ammonium dihydrogen phosphate) crystal, for example.

Laser beam 12 and modulator 16 are preferably oriented such that the plane of polarization of the beam 12 is at a 45° angle with respect to the mutually perpendicular induced axes of birefringence 15 and 17 of the modulating device. For convenience, beam 12 may be considered as two equal amplitude laser beam components having the same instantaneous phase but linearly polarized in mutually perpendicular planes coinciding with the planes of the induced axes of birefringence of the modulating device.

A modulator driver 18 varies the electrical field to which the active device of modulator 16 is subjected according to an informational signal $V_{in}$ applied at input terminal 20 of driver 18 so as to vary the indices of refraction of the induced axes of birefringence of the modulating device.

In the absence of a signal at input terminal 20, carrier beam 12 remains unchanged in phase, and the resultant output beam 22 from modulator 16 is linearly polarized in the same plane as the beam 12. When a signal is applied to input terminal 20, driver 18 causes the modulating element of modulator 16 to be subjected to an electric field which produces a corresponding phase shift in laser beam 22, the amount of phase shift being essentially directly proportional to the magnitude of the voltage applied to modulator 16 by driver 18. The component of beam 12 polarized in the plane of the induced axis having a lower index of refraction is phase shifted so as to lag beam 12, while the beam component polarized in the plane of the higher index induced axis is phase shifted so as to lead beam 12.

When modulated laser beam 22 is resolved into two orthogonal components of equal amplitude and oriented in the same planes as those of the induced axes of birefrigence 15 and 17 of modulator 16, one beam component 28 may be characterized by the function cos $(\omega_c t + \phi)$, and the other beam component 30 may be characterized by the function cos $(\omega_c t - \phi)$ where $\omega_c$ is the carrier frequency of the beam 12, $t$ is time, and $\phi$ is the instantaneous phase angle which is essentially proportional to the magnitude of the modulating voltage applied to the modulator 16.

Modulated laser beam 22 is applied to transmitting optics 31 for transmission to a distant receiving station. The transmitting optics 31 may include a telescope or collimator for converting the beam 22 into a relatively wide, well-collimated beam 32 which is more suitable for transmission over a distance.

A receiver 34 at a receiving station receives the transmitted phase modulated laser beam 32 through receiving optics 36 which may include an inverting telescope. If laser beam 38 from the receiving optics 36 is resolved into two orthogonal components of equal amplitude in planes parallel to those of the induced axes of birefrigence 15 and 17 of modulator 16, a pair of beam components 37 and 39 result corresponding to the respective beam components 28 and 30 in the transmitter 10 and bearing the same phase relationship as the beam components 28 and 30.

The received beam 38 is mixed at a beamsplitter 40 with a local oscillator laser beam 42 generated by a laser local oscillator 43. Laser local oscillator 43 is preferably of the same type as transmitter laser oscillator 11 and produces a laser beam which is linearly polarized along a plane 41 which is parallel to the plane of polarization 14 of the transmitter carrier beam 12. The frequency of the local oscillator laser beam 42 is made equal to $(\omega_c - \omega_i)$, i.e., the difference between the carrier frequency $\omega_c$ and a selected intermediate frequency $\omega_i$.

Most of the energy in received beam 38 is transmitted by beamsplitter 40 and some of the energy in local oscillator beam 42 is reflected by beamsplitter 40 to produce a combined beam 44. Combined beam 44 is directed onto a polarizing prism 45 having its polarizing axis disposed at an angle of 45° with respect to the plane of polarization of the beam 44. Polarizing prism 45 may be a Wollaston prism, a Rochon prism, a Senermont prism, or any device that separates an incident light beam into two linearly polarized light beams having mutually perpendicular planes of polarization.

Polarizing prism 45 separates combined beam 44 into a pair of beams 46 and 48 which are linearly polarized in respective planes parallel to the planes of polarization of beam components 37 and 39. Specifically, beam 46 contains a first beam portion 51 derived from received beam 38 and a second beam portion 53 derived from local oscillator beam 42, both beam portions being disposed in a plane parallel to that of beam component 39. Beam 48 contains a first beam portion 55 derived from received beam 38 and a second beam portion 57 derived from local oscillator beam 42, both beam portions being disposed in a plane parallel to that of beam component 37. Each of the beam portions 51 and 55 carries phase modulation with an instantaneous phase angle $\phi$ corresponding to that applied to beam components 30 and 28, respectively, in the transmitter 10.

It is pointed out that beams 46 and 48 may be produced by an alternative arrangement to that described above. In such an arrangement polarizing prism 45 is eliminated, and beamsplitter 40 takes the form of a Brewster angle polarizer which may be a germanium plate, for example. Beams 38 and 42 are caused to impinge upon such a plate at the Brewster angle from opposite sides of the plate, each beam being polarized at a 45° angle to the direction at which light passes through the plate essentially unattenuated.

Beams 46 and 48 are directed onto optic-to-electric transducers 60 and 62, respectively. Transducers 60 and 62 may be indium arsenide diodes or other semiconductor type detectors, or they may be superconductor point-contact diodes or photomultipliers. The transducers 60 and 62 convert the laser beams 46 and 48 into electrical signals of a frequency equal to the intermediate beat frequency $\omega_i$, the instantaneous phase relationship of these electrical signals corresponding to the phase modulation carried by beam portions 51 and 55.

The phase modulated electrical signals from transducers 60 and 62 are amplified by phase-matched linear IF amplifiers 63 and 64, respectively, and then applied to respective inputs of a phase comparator 66. Limiters may be interposed between the IF amplifiers 63 and 64 and the respective inputs to phase comparator 66 in order to eliminate excessive amplitude excursions caused by atmospheric disturbances in the transmission of beam 32 to receiver 34.

Phase comparator 66 compares the instantaneous phase of the two electrical signals derived from respective beams 46 and 48 and produces an output voltage $V_{out}$ proportional to the phase difference between these two signals. Since this phase difference is proportional to the modulation phase angle $\phi$, an output voltage $V_{out}$ is provided which reproduces the informational signal $V_{in}$ applied to the transmitter input terminal 20.

The output from IF amplifier 64 (or alternatively amplifier 63) may be sampled by a frequency control device 68 which regulates the frequency of local oscillator 43 to insure a constant intermediate frequency $\omega_i$. Frequency control device 68 may include a discriminator for converting frequency deviations from the desired intermediate frequency $\omega_i$ into corresponding amplitude variations. The resultant amplitude varying signal is applied via an appropriate transducer to the local oscillator 43 in order to vary the local oscillator frequency in a manner to maintain a constant intermediate frequency $\omega_i$.

From the foregoing, it will be apparent that the present invention provides a phase modulation laser communication system which is both simple in design and reliable in operation, especially when amplitude or frequency variations occur in the transmitted signal due to the intervening environment. In addition, since the entire output of laser oscillator 11 is utilized in the transmitted beam, maximum power efficiency can be realized. Moreover, the system requires only a minimum number of optical components, thereby minimizing internal loss.

Although the present invention has been shown and described with reference to a particular embodiment, nevertheless various changes and modifications obvious to one skilled in the art to which the invention pertains are deemed to lie within the spirit, scope and contemplation of the invention.

What is claimed is:

1. A phase modulation laser communication system comprising:
   - a transmitter including means for generating a laser carrier beam at a predetermined carrier frequency and linearly polarized in a predetermined plane, means for phase modulating said laser carrier beam with an informational signal such that when the resultant beam is resolved into two linearly polarized component beams in mutually perpendicular planes the respective component beams are shifted forwardly and backwardly in phase relative to said laser carrier beam, and means for directing the phase modulated laser beam toward a receiver; and
   - a receiver including means for receiving said phase modulated laser beam, means for generating a second laser beam at a frequency equal to the difference between said carrier frequency and a preselected intermediate frequency and linearly polarized in a plane parallel to said predetermined plane, means for combining the received phase modulated laser beam and said second laser beam and for separating the resultant beam into a pair of linearly polarized laser beams in respective planes perpendicular to one another, transducer means for converting each of said pair of linearly polarized laser beams into an electrical signal at essentially said preselected intermediate frequency, and means for comparing the instantaneous phase of the said electrical signals and producing an electrical output signal corresponding to the phase difference therebetween, said output signal essentially reproducing said informational signal.

2. A phase modulation laser communication system according to claim 1 wherein the beam combining and separating means of the receiver includes a beam splitter disposed so as to transmit a portion of the energy in the received phase modulated laser beam and to reflect a portion of the energy in said second laser beam along the same path, and a polarizing prism disposed in said path.

3. A phase modulation laser communication system according to claim 2 wherein said means for phase modulating said laser carrier beam includes an electro-optic device having mutually perpendicular induced axes of birefringence oriented at an angle of 45° with respect to said predetermined plane, and said polarizing prism has a polarizing axis disposed at an angle of 45° with respect to said predetermined plane.

4. A phase modulation laser communication system according to claim 1 wherein said receiver further includes control means coupled to said transducer means for deriving a signal indicative of the frequency of at least one of said electrical signals and for controlling the frequency of said means for generating a second laser beam to maintain said preselected intermediate frequency at an essentially constant value.

* * * * *